R. W. SAMPSON.
TIRE PLUG.
APPLICATION FILED AUG. 17, 1916.
1,221,912.
Patented Apr. 10, 1917.
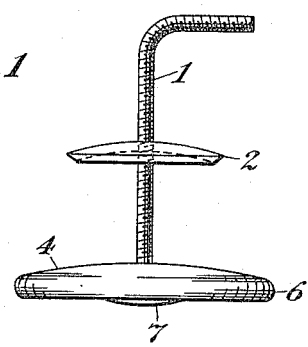
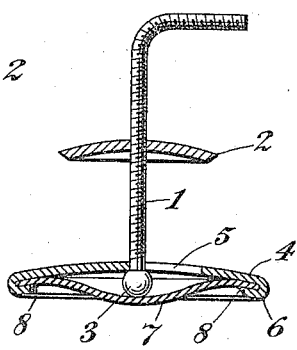
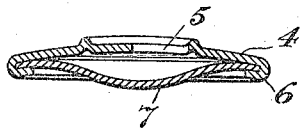
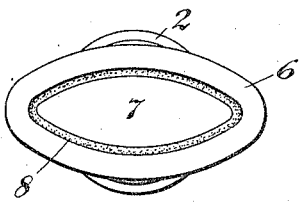
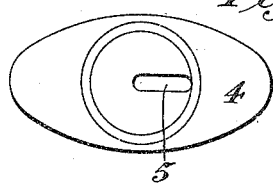
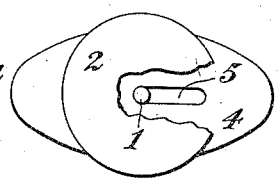
Inventor:
Robert William Sampson
by
Andrew Wilson
Attorney.

UNITED STATES PATENT OFFICE.

ROBERT WILLIAM SAMPSON, OF WHITESTONE, NEW YORK, ASSIGNOR OF ONE-HALF TO LOUIS SCHWAB, OF EAST ORANGE, NEW JERSEY.

TIRE-PLUG.

1,221,912.

Specification of Letters Patent.

Patented Apr. 10, 1917.

Application filed August 17, 1916. Serial No. 115,373.

*To all whom it may concern:*

Be it known that I, ROBERT WILLIAM SAMPSON, a subject of the King of Great Britain, residing at Malba, Whitestone, Long Island, New York, have invented certain new and useful Improvements in Tire-Plugs, of which the following is a specification.

My invention relates to plugs for repairing pneumatic tires, particularly plugs of the class shown in my Letters Patent of the United States No. 632,540 of September 5th, 1899. And my improvements are directed to means whereby a more perfect sealing contact may be established between the inner closing element or head of the plug and the interior of the tire.

Heretofore in the art the inner closing element or head of a tire plug has been composed of a slotted face plate through which the clamping shank passes, and a backing plate the edges of which are crimped around the face plate and clamped down to form a flange on its upper side. Between these two plates is held the head of the clamping shank, the shaft of which is allowed to be bent down in the slot in the upper plate. In practice, even if the edges of the plates are so closely crimped together as to prevent any leakage of air between them, yet there is always more or less danger of air escaping along the edge of the flange toward the shank of the plug and thence upward through the puncture, because the clamping cap which coöperates with the head is circular, while the head is elliptical and does not present a uniform upper surface in opposition to the cap. Consequently, the clamping together of the cap and head tends to draw the marginal flange of the head against the tire more forcefully than it does the depressed face plate. And in consequence there is danger of leakage of the air between the edge of the flange and the material of the tire, as above suggested.

To avoid this danger of leakage I so construct the head of my improved plug as to produce a uniformly smooth and even surface, devoid of irregularities or flanges, in opposition to the clamping cap, as I will now proceed to describe.

In the drawings Figure 1 is a side elevation of my improved plug; Fig. 2 is a vertical sectional view of the same; Fig. 3 is a bottom view of the plug; and Fig. 4 is a top view of the cap (partly broken away) and the head; Figs. 5 and 6 illustrate a modification.

The threaded shank 1 carries a clamping cap 2, and has a head 3 adapted to engage behind the face plate 4. This face plate is provided with a slot 5, in which the stem of the shank 1 may be bent over, while the head 3 is held below the plate 4. The edge of the plate 4 is bent downward and crimped inward to form a flange 6, which surrounds and holds in place the back plate 7, which acts to retain the head 3 of the shank 1 in place and to close the lower side of the composite head. If desired the joint between the flange 6 and the back plate 7 may be sealed, in the process of manufacture or otherwise, against leakage, by the use of lacquer, cement or other sealing material as indicated by 8 in Figs. 1 and 3.

By this arrangement I secure a plug the head of which is composed of two metal plates adapted to hold the head of the clamping shank between them, so as to secure the advantages of rotating and bending over the shank, while the upper face of the head which is intended to bear against the inner face of the tire, presents an even and uniform surface in opposition to the under surface of the coöperating clamping cap. And, while, as in the previous constructions, the air within the tire may make its way between the inner surface of the tire and the ends of the head where they project beyond the cap, yet it can go no farther, for the tire will be gripped evenly and uniformly between the opposed faces of the head and the cap so that there will be no irregularities or angles to invite leakage of air between the head and the inner surface of the tire.

If desired one or more annular heads or flanges may be formed upon the face of the head opposed to the cap, such beads or flanges presenting a uniform contour toward the cap, as illustrated in Figs. 5 and 6. This construction will cause the head to afford an equal or uniform opposition to the cap entirely around the cap, although, the planes of resistance of the head to the cap may vary axially.

Having thus described my invention what I claim and desire to secure by Letters Patent of the United States is:—

1. In a puncture closer for pneumatic tires, the combination of a metal head having a hollow interior between a closed back and a substantially uniform, integral upper face provided with a shank-accommodating opening into the hollow interior, a clamping shank and a coöperating clamping cap.

2. In a puncture closer for pneumatic tires, the combination of an elliptical, metal head having a hollow interior between a closed back and a substantially uniform, integral upper face provided with a shank accommodating opening into the hollow interior, a clamping shank and a coöperating clamping cap.

3. In a puncture closer for pneumatic tires, the combination of an elliptical, metal head having a hollow interior between a closed back and a substantially uniform, integral upper face provided with a shank accommodating opening into the hollow interior, a clamping shank and a discal, coöperating clamping cap.

4. In a puncture closer for pneumatic tires, the combination of a hollow, metal head the upper surface of which is substantially uniform and integral and is provided with a shank accommodating opening therethrough, said head being formed of a back plate and a face plate forming an airtight connection therewith, a clamping shank and a coöperating clamping cap.

5. In a puncture closer for pneumatic tires, the combination of a metal head having a back formed by an imperforate back element and a substantially uniform, integral face formed by an element having a shank admitting opening therethrough, the said face element and back element forming between them a shank-holding hollow, a clamping shank and a coöperating clamping cap.

6. In a puncture closer for pneumatic tires, the combination of a head wholly of metal provided with an interior shank-holding socket the back of which is tightly closed, a clamping shank, and a coöperating clamping cap, the opposed faces of the head and cap presenting substantially uniform, integral surfaces.

7. In a puncture closer for pneumatic tires, the combination of an elongated head wholly of metal provided with an interior shank-holding socket the back of which is tightly closed, a clamping shank, and a discal, coöperating clamping cap, the upper face of the head presenting a substantially uniform, integral surface in opposition to the under face of the cap.

8. In a puncture closer for pneumatic tires, the combination, with a clamping shank and a coöperating cap, of a metallic head composed of a back plate and of a face plate provided with a marginal flange exteriorly engaging the back plate.

9. In a puncture closer for pneumatic tires, the combination, with a clamping shank and a coöperating cap, of a metallic head composed of a back plate and of a face plate provided with a marginal flange engaging the back plate by being crimped around it.

ROBERT WILLIAM SAMPSON.

Witness:
HOWARD M. ROWE.

Copies of this patent may be obtained for five cents each, by addressing the "Commissioner of Patents, Washington, D. C."